United States Patent
Nakayama

(10) Patent No.: US 7,929,031 B2
(45) Date of Patent: Apr. 19, 2011

(54) IMAGE PROCESSING APPARATUS AND IMAGE PROCESSING METHOD

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/133,574

(22) Filed: Jun. 5, 2008

(65) Prior Publication Data

US 2008/0303952 A1    Dec. 11, 2008

(30) Foreign Application Priority Data

Jun. 7, 2007  (JP) ................ 2007-152123

(51) Int. Cl.
  *H04N 5/217* (2006.01)
  *H04N 5/00* (2006.01)
  *G06K 9/40* (2006.01)

(52) U.S. Cl. ........ 348/241; 348/607; 382/260; 382/265; 382/266

(58) Field of Classification Search .......... 348/241, 348/607; 382/260, 265, 266
See application file for complete search history.

(56) References Cited

U.S. PATENT DOCUMENTS

| | | | |
|---|---|---|---|
| 5,130,798 A | 7/1992 | Christopher | |
| 5,185,664 A | 2/1993 | Darby | |
| 6,144,800 A * | 11/2000 | Kobayashi | 386/264 |
| 7,339,706 B2 * | 3/2008 | Ohta | 358/3.03 |
| 2007/0071354 A1 | 3/2007 | Florent et al. | |
| 2007/0247554 A1* | 10/2007 | Okumichi et al. | 348/607 |
| 2008/0002063 A1* | 1/2008 | Kimura et al. | 348/607 |

FOREIGN PATENT DOCUMENTS

| | | |
|---|---|---|
| JP | 1-273487 A | 11/1989 |
| JP | 3158371 B | 7/1991 |

\* cited by examiner

*Primary Examiner* — David L Ometz
*Assistant Examiner* — Quang V Le
(74) *Attorney, Agent, or Firm* — Canon U.S.A., Inc. I.P. Division

(57) ABSTRACT

An image processing apparatus includes a feedback unit configured to perform first nonlinear conversion of a signal obtained by subtracting a value of a subtraction image signal from that of a current-frame image signal, and to obtain the next subtraction signal by subtracting a signal obtained by performing the first nonlinearly conversion from the current-frame image signal, and a noise reduction unit configured to perform second nonlinear conversion of a signal obtained by subtracting a value of the subtraction image signal from that of the current-frame image signal, and to obtain an output image signal by subtracting a signal obtained by performing the second nonlinear from the current-frame image signal.

7 Claims, 15 Drawing Sheets

FIG.14A
REFERENCE
FIG.14C
DIFFERENCE
= 14B-14A
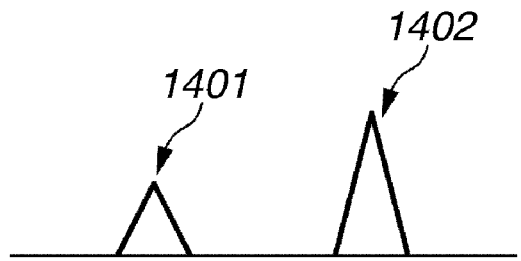
FIG.14B
INPUT
FIG.14D
OUTPUT OF NOISE
REDUCTION UNIT
FIG.14E
RESULT OF NOISE
REDUCTION
= 14B-14D

REFERENCE

INPUT

DIFFERENCE
= 15B-15A

OUTPUT OF NOISE
REDUCTION UNIT

RESULT OF NOISE
REDUCTION
= 15B-15D

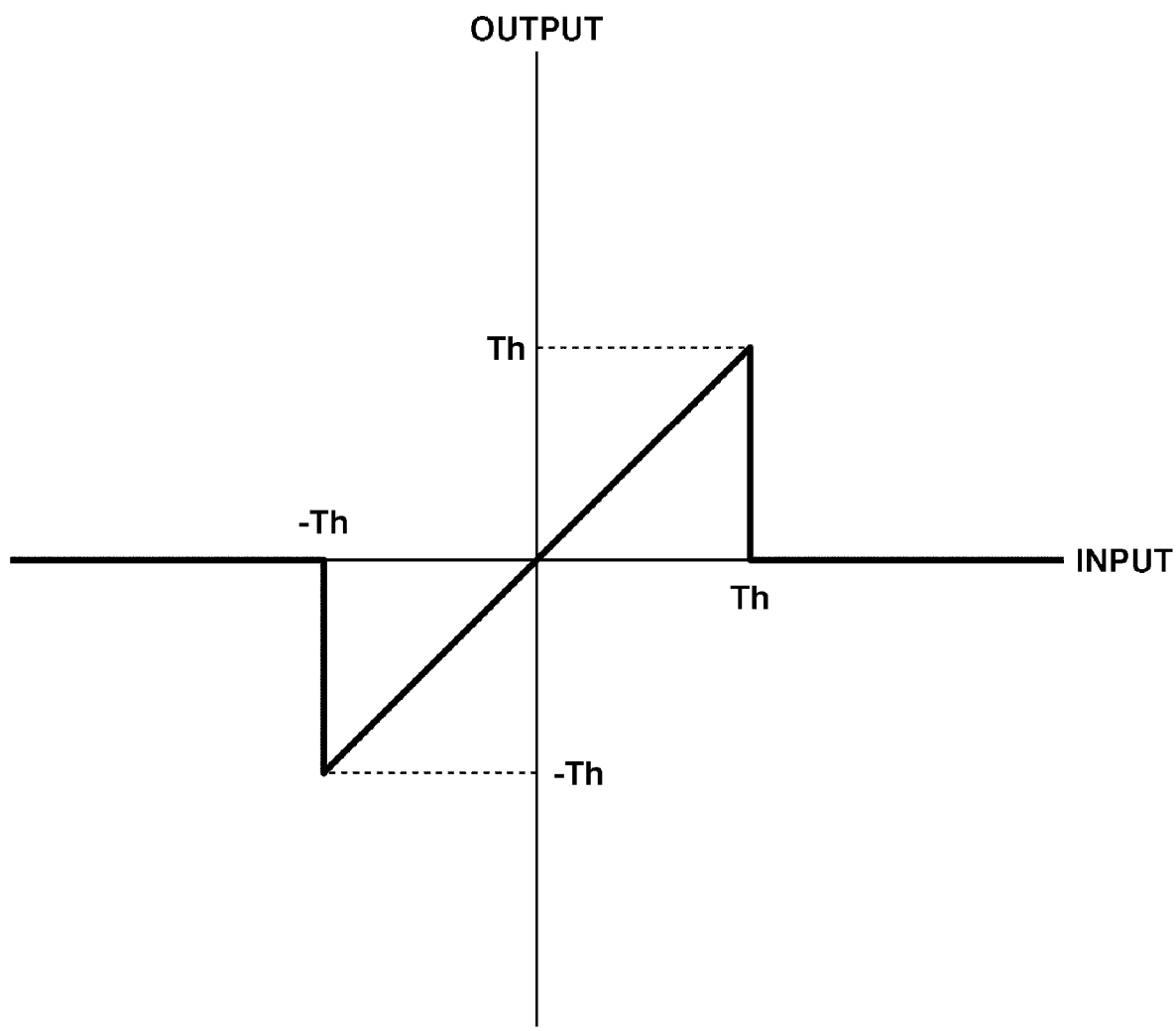

IMAGE PROCESSING APPARATUS AND IMAGE PROCESSING METHOD

BACKGROUND OF THE INVENTION

1. Field of the Invention

The present invention relates to an image processing apparatus and an image processing method. More particularly, the present invention relates to an image processing apparatus and an image processing method for use in recursive processing for noise reduction.

2. Description of the Related Art

X-ray fluoroscopic images are taken at very low X-ray doses in view of radiation exposure adverse-effects. Accordingly, much quantum noise is superposed on the taken X-ray fluoroscopic images. Hitherto, noise reduction has been achieved by applying recursive filtering to perform smoothing of pixels in a time direction, since spatial smoothing processing is not sufficient to remove the noise. The recursive filtering (also referred to as interframe noise reduction processing) is very effective in reducing noise in a plurality of still images. However, when the recursive filtering is applied to moving images, image lags can be generated. Therefore, the recursive filter is not always effective in reducing noise in moving images.

Thus, Japanese Patent Application Laid-Open No. 1-273487 discusses a digital X-ray apparatus capable of displaying a clear image with less image lag in which noise is sufficiently reduced in a case where recursive filtering is performed on a moving image or a continuous image. This digital X-ray apparatus has a separation circuit unit, a filter circuit unit, and an addition circuit unit to achieve noise reduction processing with a reduced image lag. The separation circuit unit separates each frame of an X-ray fluoroscopic image into a low-frequency component image and a high-frequency component image. The filter circuit unit performs recursive filtering on the high-frequency component image. This addition circuit unit adds the separated low-frequency component image to the high-frequency component image on which the recursive filtering has been performed.

Japanese Patent No. 3158371 discusses a noise reducer for reducing noise which extracts a noise signal from a difference signal generated by a difference between a moving image reproduced by an analog video tape recorder and an image obtained by a recursive filter, and subtracts the extracted noise signal from the reproduced moving image. This noise reducer detects motion of an image with a simple method, and changes a reduced amount of noise between the moving image and a still image. Consequently, the noise reducer performs noise reduction processing with less image lag. FIG. 13 illustrates a configuration of a conventional interframe noise reduction unit for recursive filtering. As illustrated in FIG. 13, the interframe noise reduction unit includes a frame memory 1301, subtracters 1302 and 1304, and a nonlinear processing unit 1303.

The frame memory 1301 stores results of noise reduction. The result of noise reduction stored in the frame memory 1301 is delayed by one frame and used as a reference image for performing noise reduction processing on the next input frame image. The subtracter 1302 subtracts the reference image which is supplied from the frame memory 1301 from the input frame image input thereto, and outputs a result of the subtraction to the nonlinear processing unit 1303.

The nonlinear processing unit 1303 performs nonlinear processing on the result of the subtraction (a difference signal) obtained from the subtracter 1302 to extract noise signals having small amplitudes. The subtracter 1304 performs noise reduction on the input frame image by subtracting the noise signals which are extracted by the nonlinear processing unit 1303 from the input frame image. Then, the subtracter 1304 outputs results of the noise reduction which are stored in the frame memory 1301.

Generally, in the interframe noise reduction processing, an amount of noise reduction has an inverse relationship with a blur of movement of an object. When the amount of noise reduction is increased in the interframe noise reduction processing, a moving object is likely to be blurred. On the other hand, when blur of a moving object is to be reduced, it is necessary to decrease the amount of noise reduction.

In the interframe noise reduction unit illustrated in FIG. 13, when the amount of noise reduction is decreased to reduce the blur due to movement of an object in a noise-reduced image, a frame image containing much residual noise becomes a reference image without reducing much noise. This phenomenon adversely affects noise reduction of the next input frame image.

The influence of residual noise on the noise reduction processing is described hereinafter. FIGS. 14A to 14E illustrate results of interframe noise reduction of an input image in a case where a reference image contains no noise. FIGS. 15A to 15E illustrate results of interframe noise reduction of an input image in a case where a reference image contains residual noise.

In the case illustrated in FIGS. 14A to 14E, the reference image contains no noise. Thus, it is supposed that the amplitude level of the reference image is constant without varying (for simplicity of description, amplitude levels at pixels of each of the images are disregarded), as illustrated in FIG. 14A. When the input image containing noise illustrated in FIG. 14B is input, the difference in amplitude level at each pixel between the input image and the reference image illustrated in FIG. 14A is obtained by the subtracter 1302 as a difference signal illustrated in FIG. 14C.

The nonlinear processing unit 1303 extracts only signals, the amplitude level of which is equal to or less than a predetermined threshold value (Th), from the difference signal illustrated in FIG. 14C as noise. Thus, the nonlinear processing unit 1303 obtains signals illustrated in FIG. 14D. All amplitude levels of a signal 1401 on a left side of FIG. 14C are equal to or lower than the threshold value (Th). Accordingly, the signal 1401 is entirely extracted by the nonlinear processing unit 1303. On the other hand, a signal 1402 on a right side of FIG. 14C, has portions whose amplitude level is equal to or lower than the threshold value (Th) and whose amplitude level is higher than the threshold value (Th). Thus, only the portions whose amplitude level is equal to or lower than the threshold value (Th) of the signal 1402 are extracted by the nonlinear processing unit 1303.

The nonlinear processing including such extraction can be easily implemented using a look-up table having an input/output characteristics illustrated in FIG. 16. The input/output characteristics illustrated in FIG. 16 is adapted to the nonlinear processing unit 1303 to pass a signal whose absolute value of the amplitude level is equal to or lower than the threshold value (Th) as it is, and to cut off a signal whose absolute value of the amplitude level is higher than the threshold value (Th) to zero. The threshold value (Th) is determined so as to cover a sufficiently large range of noise distribution. For convenience of description, only an outline of the nonlinear processing is described herein. Thus, a graph of the input/output characteristics illustrated in FIG. 16 has a simple shape. However, if the input/output characteristics illustrated in FIG. 16 is used without change, noise having an amplitude level which is equal to or higher than the threshold value (Th) is fixed and is not attenuated. Therefore, actually used input/output characteristics have a complex shape.

A signal (noise component) illustrated in FIG. 14D is subtracted from a signal representing the input image illustrated in FIG. 14B by the subtracter 1304 and the obtained signal is output to an external device as a result of the noise reduction as illustrated in FIG. 14E. As above-described, the result of the noise reduction is stored in the frame memory 1301 and is used as a reference image for performing the noise reduction on the next input frame image. FIGS. 14A to 14E illustrate that although noise whose amplitude level is higher than the threshold value (Th) in the input frame image cannot be eliminated, noise whose amplitude level is equal to or lower than the threshold value (Th) can be clearly eliminated.

In the case illustrated in FIGS. 15A to 15E, the reference image contains residual noise. As is understood from the foregoing description, noise is left in the reference image in a case where the amplitude level of the noise is higher than the threshold value (Th). Thus, it is supposed in the reference image illustrated in FIG. 15A that two large noise events 1501 and 1502 remain, and that on the other hand, only one noise 1503 having a small amplitude is present in the input image at a location corresponding to the large noise 1502 illustrated in FIG. 15A. In order to illustrate that results of nonlinear processing are different on a left side half and on a right side half of a waveform of a noise, the waveform of the noise 1503 is not laterally symmetric and the amplitude of the left side half thereof is larger than the amplitude of the right-side half thereof, as viewed in FIG. 15B.

The subtracter 1302 obtains a difference in amplitude level at each pixel between an input image illustrated in FIG. 15B and the reference image illustrated in FIG. 15A as a difference signal illustrated in FIG. 15C. The difference signal has a negative polarity as illustrated in FIG. 15C, in contrast to the examples illustrated in FIGS. 14A to 14E. However, when a polarity of each noise in the reference image and the input image is reversed, also the polarity of the difference signal is reversed. Thus, the polarity of the signal is insignificant.

The nonlinear processing unit 1303 extracts only signals whose amplitude level is equal to or less than a predetermined threshold value (Th) from the difference signal illustrated in FIG. 15C as noise. Thus, the nonlinear processing unit 1303 obtains signals illustrated in FIG. 15D. A signal (noise component) illustrated in FIG. 15D is subtracted from a signal representing the input image illustrated in FIG. 15B by the subtracter 1304 and the obtained signal is output to an external device as a result of the noise reduction illustrated in FIG. 15E. Further, the result of the noise reduction is stored in the frame memory 1301 and is used as a reference image for performing the noise reduction on the next input frame image.

If noise is left in the reference image as illustrated in FIGS. 15A through 15E, noise is extracted to an output of the nonlinear processing unit 1303 which corresponds to a portion containing no noise in the input image, as illustrated in FIG. 15D. The extracted noise is subtracted from the input image. Thus, as illustrated in FIG. 15E, the extracted noise is superposed on the noise-reduced output of the nonlinear processing unit 1303. That is, the residual noise within a certain range of amplitude level still remains as the residual noise in the next frame. Moreover, an input noise is affected by residual noise in a case where the residual noise is present at a pixel of the reference image and consequently, substantially no effects of reducing noise are obtained. In addition, residual noises can further easily remain in the reference image.

If interframe noise reduction is applied to each image generated by multiresolution analysis for decomposing an image into sub-images corresponding to a plurality of frequency bands, blur due to movement of a moving object can be mitigated by adjusting the amount of noise reduction in each sub-image according to an associated one of the frequency bands. However, when the amount of noise reduction is increased, a problem that an area with movement is blurred still remains.

Accordingly, it is necessary for reducing the blur caused by the movement to lower the degree of noise reduction. However, residual noise is increased in a frame image if the degree of noise reduction performed on the image is lowered. If the frame image of a low degree of noise reduction is used as a reference image for noise reduction of the next frame image, noise in a pixel including residual noise is not reduced. In addition, residual noise can easily remain. That is, a conventional noise reduction method has a drawback that in a case where an amount of noise reduction in an output image is decreased by preferentially reducing a blur and an image lag caused by movement of a moving object, while a blur caused by movement of an object is reduced in a current frame image, effects of noise reduction of the next frame image are reduced.

SUMMARY OF THE INVENTION

The present invention is directed to an image processing apparatus that can adjust the amount of noise reduction when noise reduction is applied to an image.

According to an aspect of the present invention, an image processing apparatus includes a feedback unit configured to perform first nonlinear conversion of a signal obtained by subtracting a value of a subtraction image signal from that of a current-frame image signal, and to obtain the next subtraction signal by subtracting a signal obtained by performing the first nonlinearly conversion from the current-frame image signal, and a noise reduction unit configured to perform second nonlinear conversion of a signal obtained by subtracting a value of the subtraction image signal from that of the current-frame image signal, and to obtain an output image signal by subtracting a signal obtained by performing the second nonlinear conversion from the current-frame image signal.

According to another aspect of the present invention, a method includes performing first nonlinear conversion of a signal obtained by subtracting a value of a subtraction image signal from that of a current-frame image signal, and then obtaining the next subtraction signal by subtracting a signal obtained by performing the first nonlinearly conversion from the current-frame image signal, and performing second nonlinear conversion of a signal obtained by subtracting a value of the subtraction image signal from that of the current-frame image signal, and then obtaining an output image signal by subtracting a signal obtained by performing the second nonlinear conversion from the current-frame image signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

Figure 2:
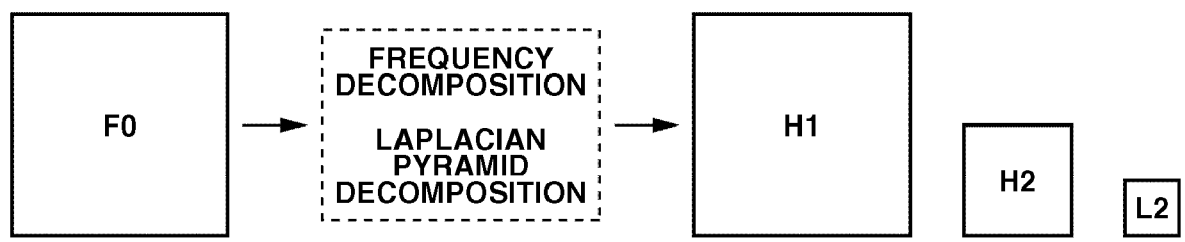

FIG. 2 illustrates the Laplacian Pyramid decomposition processing.

Figure 1:
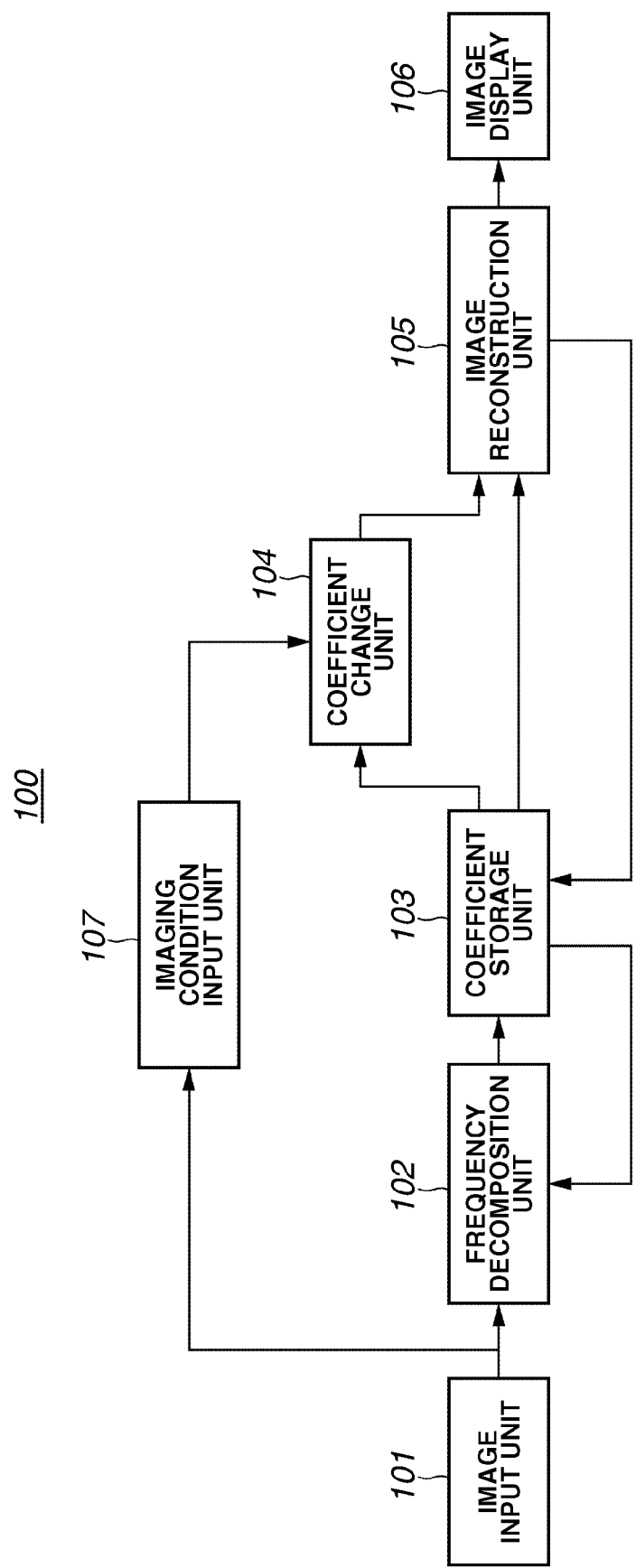
FIG. 1 illustrates a decomposition/reconstruction processing unit for performing a Laplacian pyramid decomposition/ reconstruction of an image according to an exemplary embodiment of the present invention.
Figure 3:
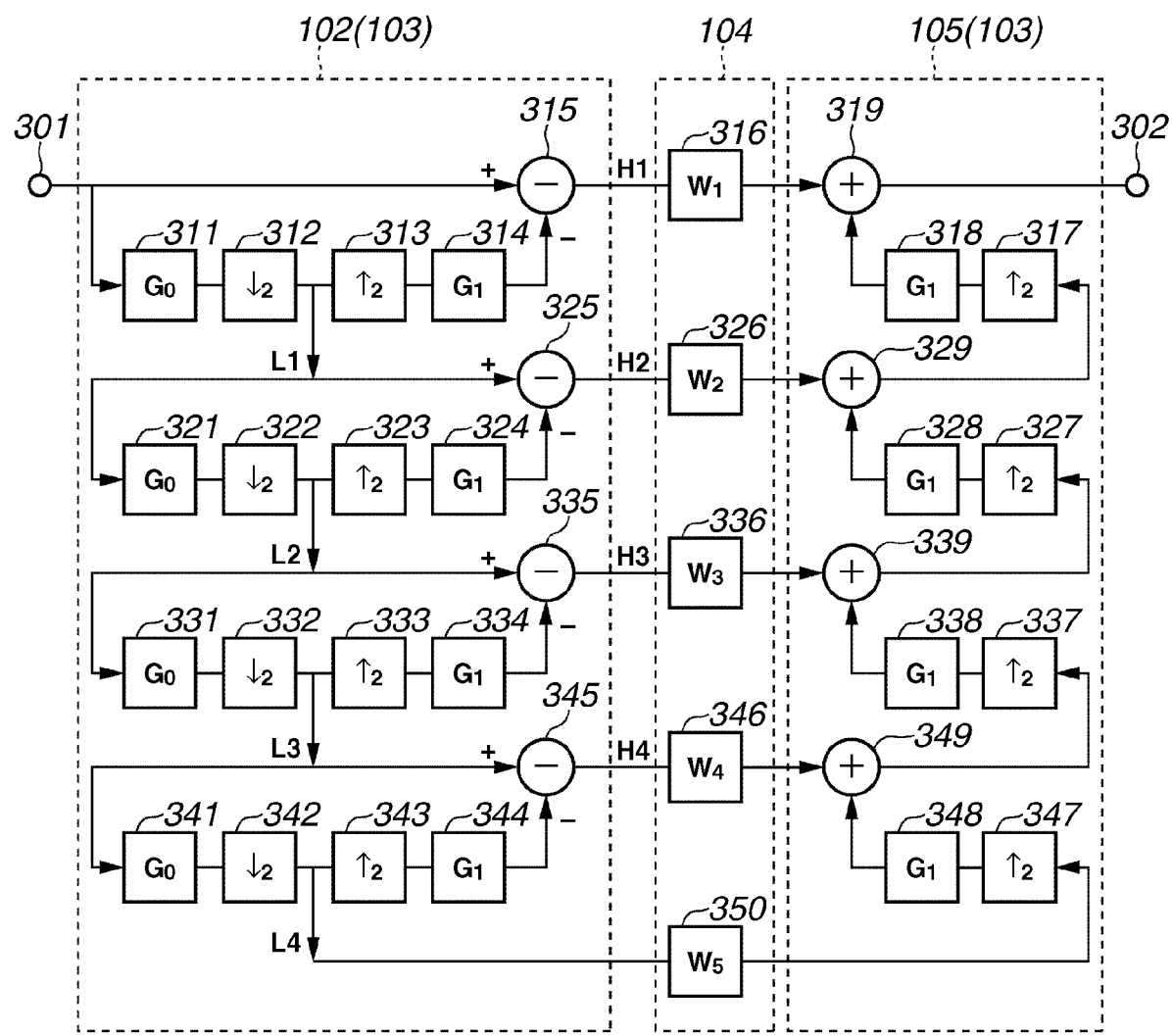

FIG. 3 illustrates the configuration of the decomposition/reconstruction processing unit illustrated in FIG. 1 in more detail.

Figure 4:
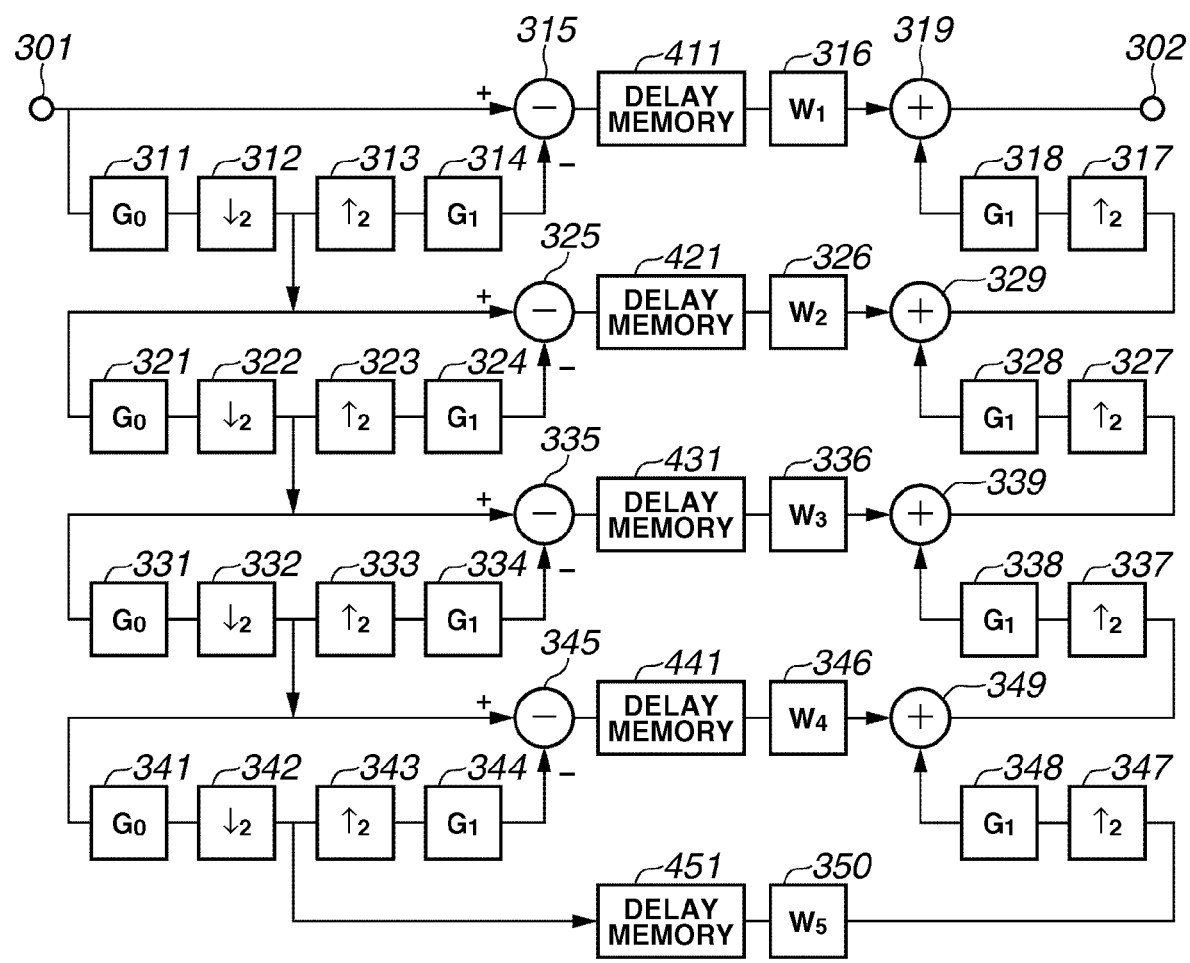

FIG. 4 illustrates an example configuration of the decomposition/reconstruction processing unit constructed in consideration of a delay due to reconstruction processing.

Figure 5:
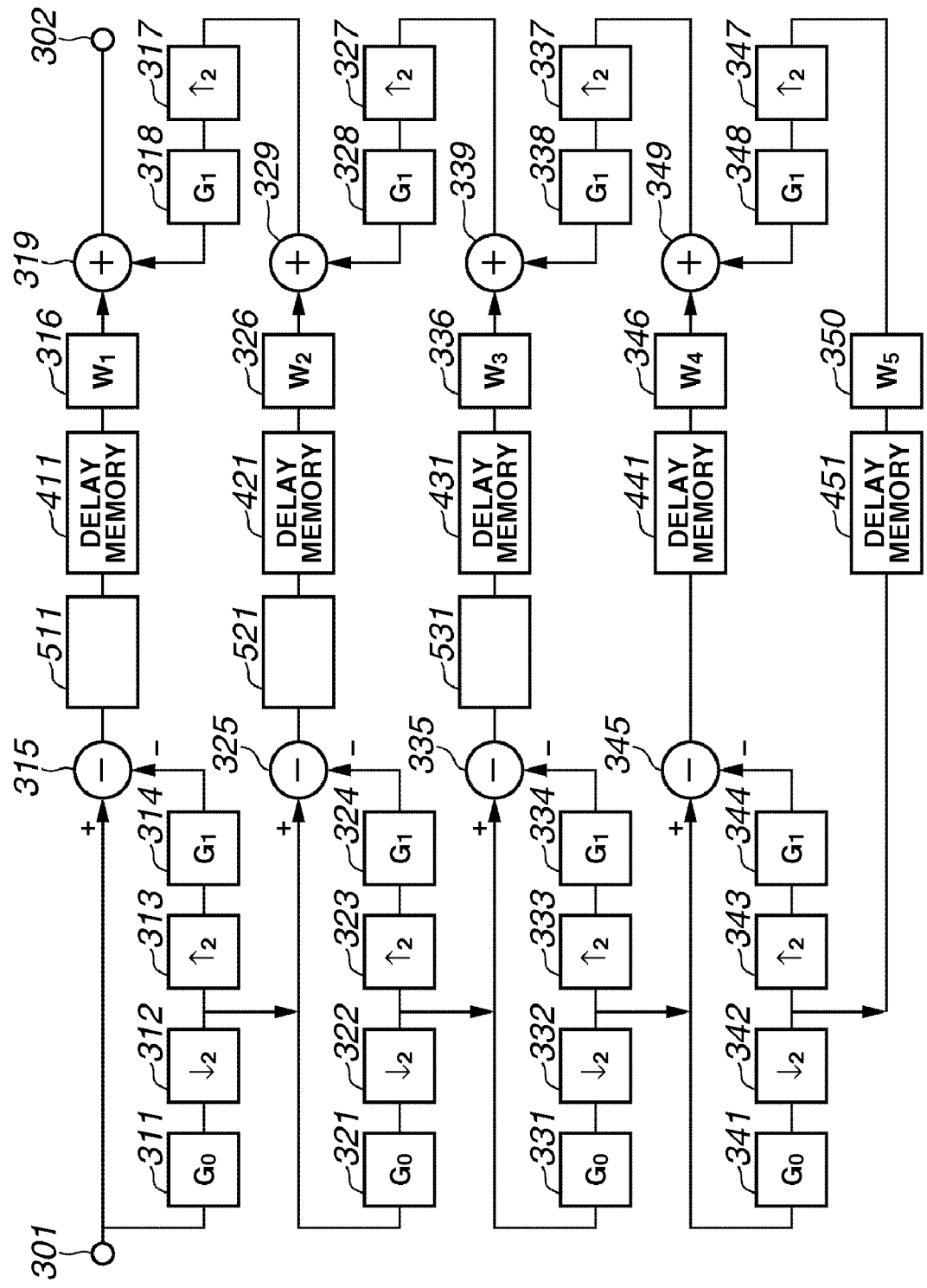

FIG. 5 illustrates an image processing apparatus according to a first exemplary embodiment of the present invention.

Figure 6:
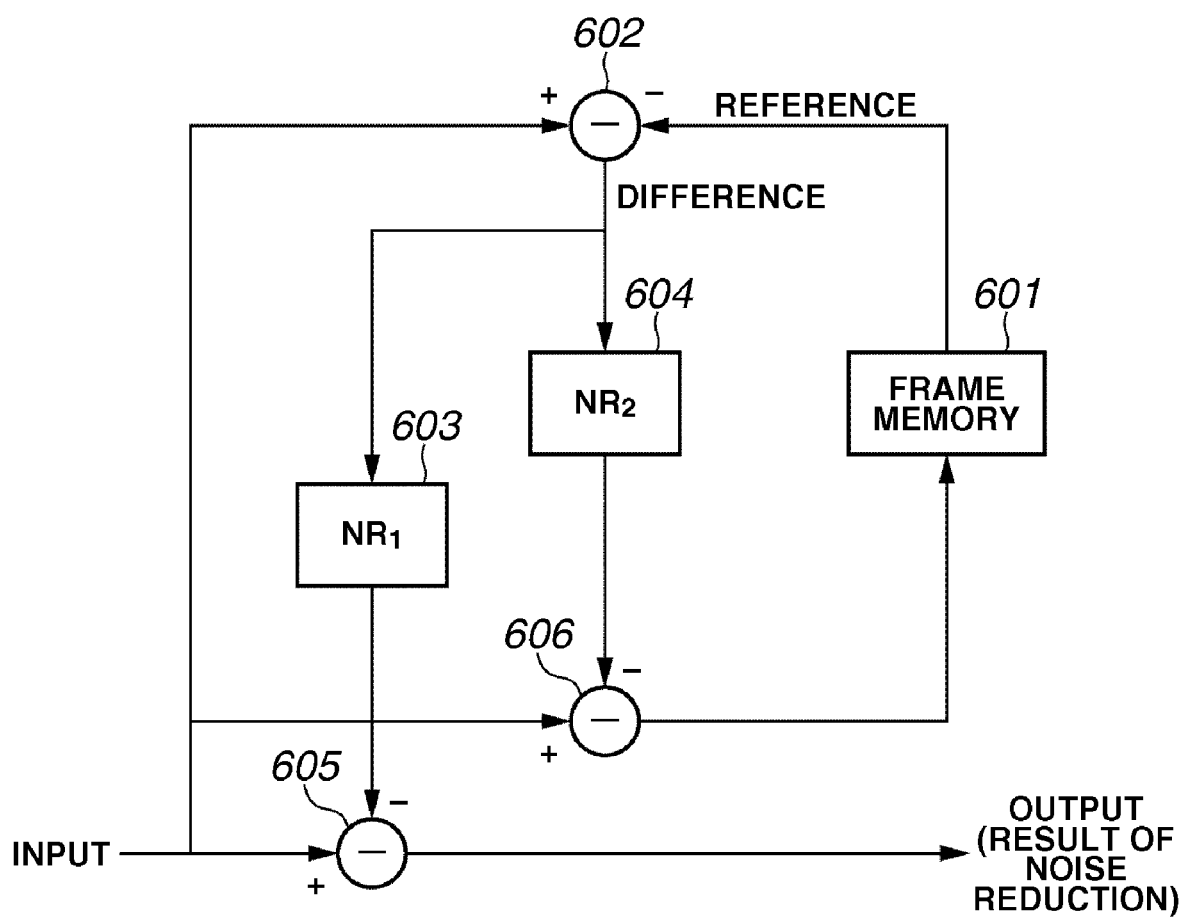

FIG. 6 illustrates an interframe noise reduction unit according to the first exemplary embodiment of the present invention.

Figure 7:
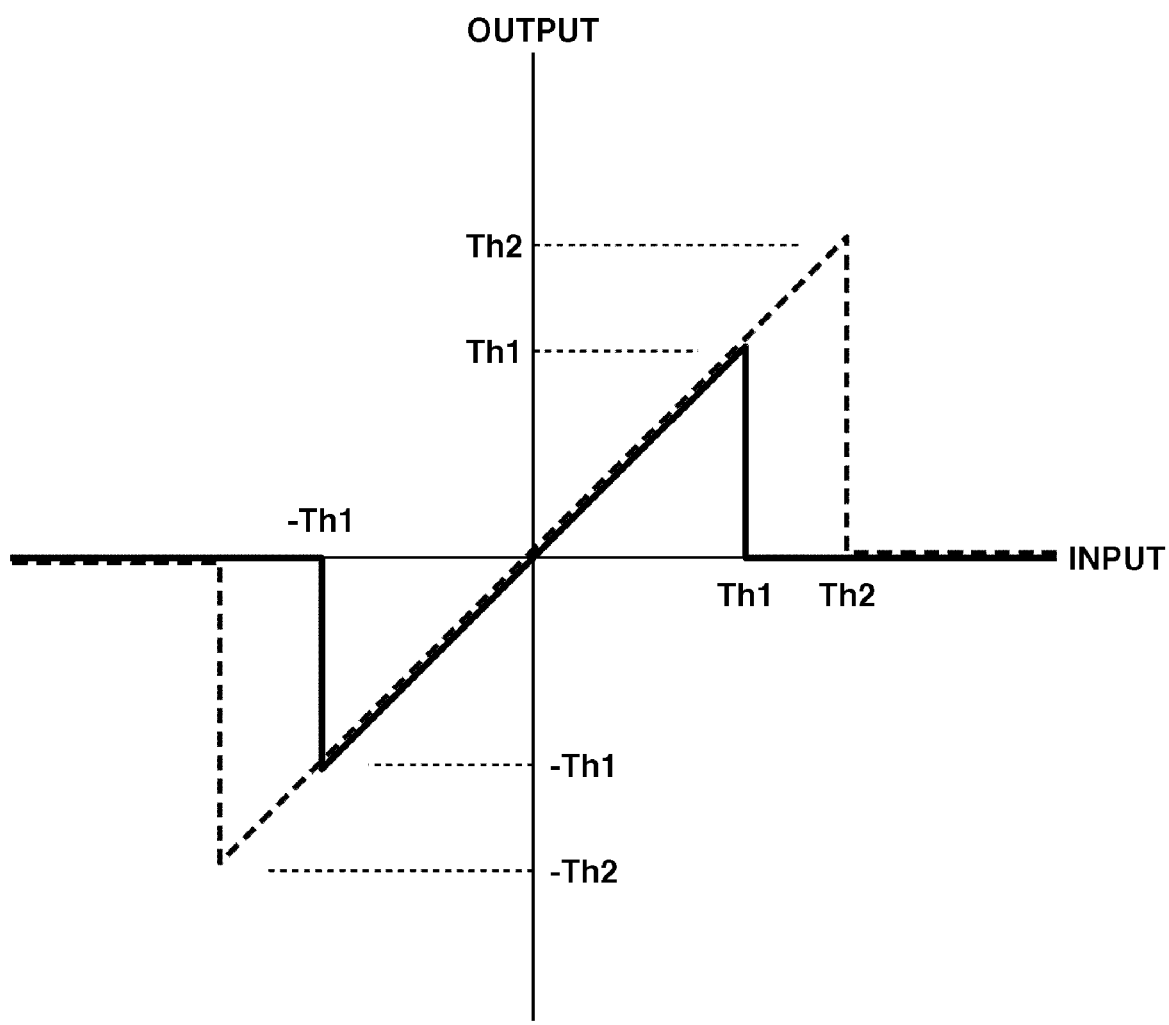

FIG. 7 illustrates an example of input/output characteristics of two nonlinear processing units.

Figure 8:
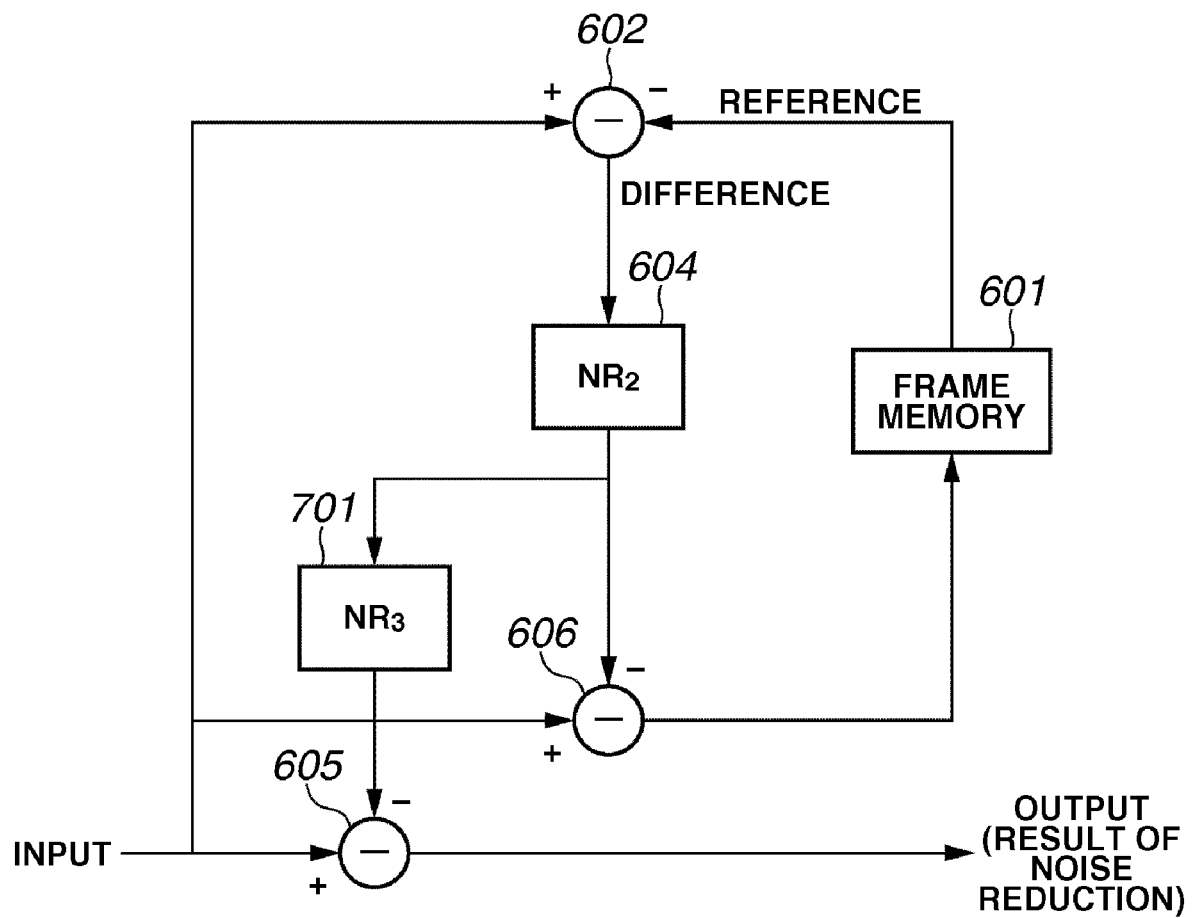

FIG. 8 illustrates an interframe noise reduction unit in a second exemplary embodiment of the present invention.

Figure 9:
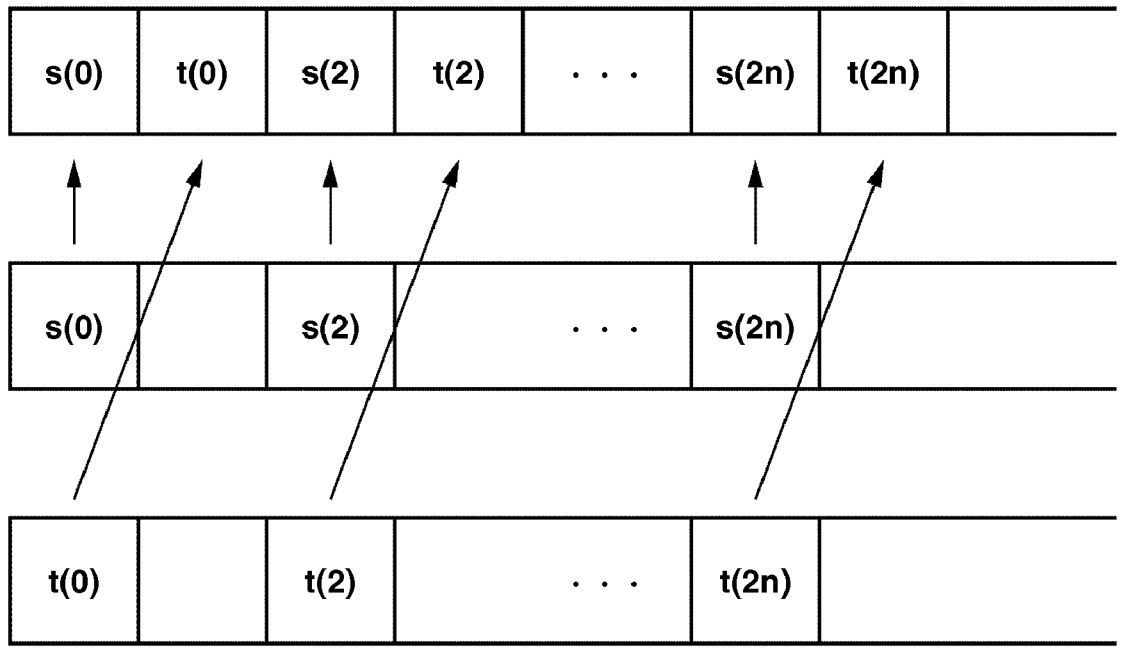

FIG. 9 illustrates a method for generating data to be stored in a conventional look-up table.

Figure 10:
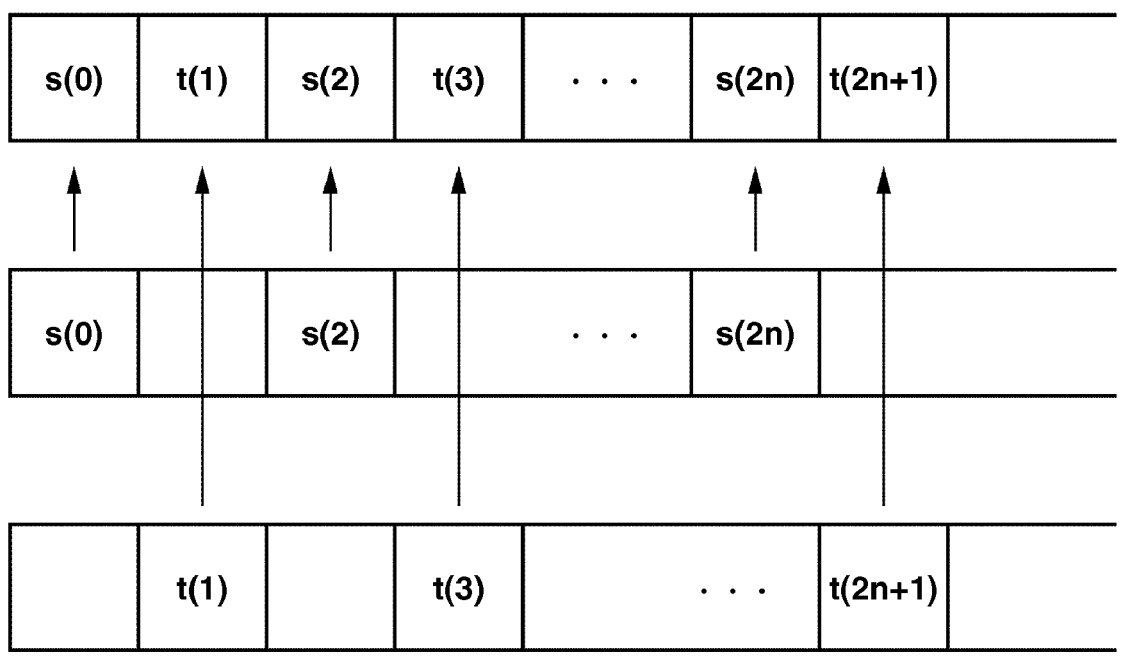

FIG. 10 illustrates a method for generating data to be stored in a look-up table in a third exemplary embodiment of the present invention.

Figure 11:
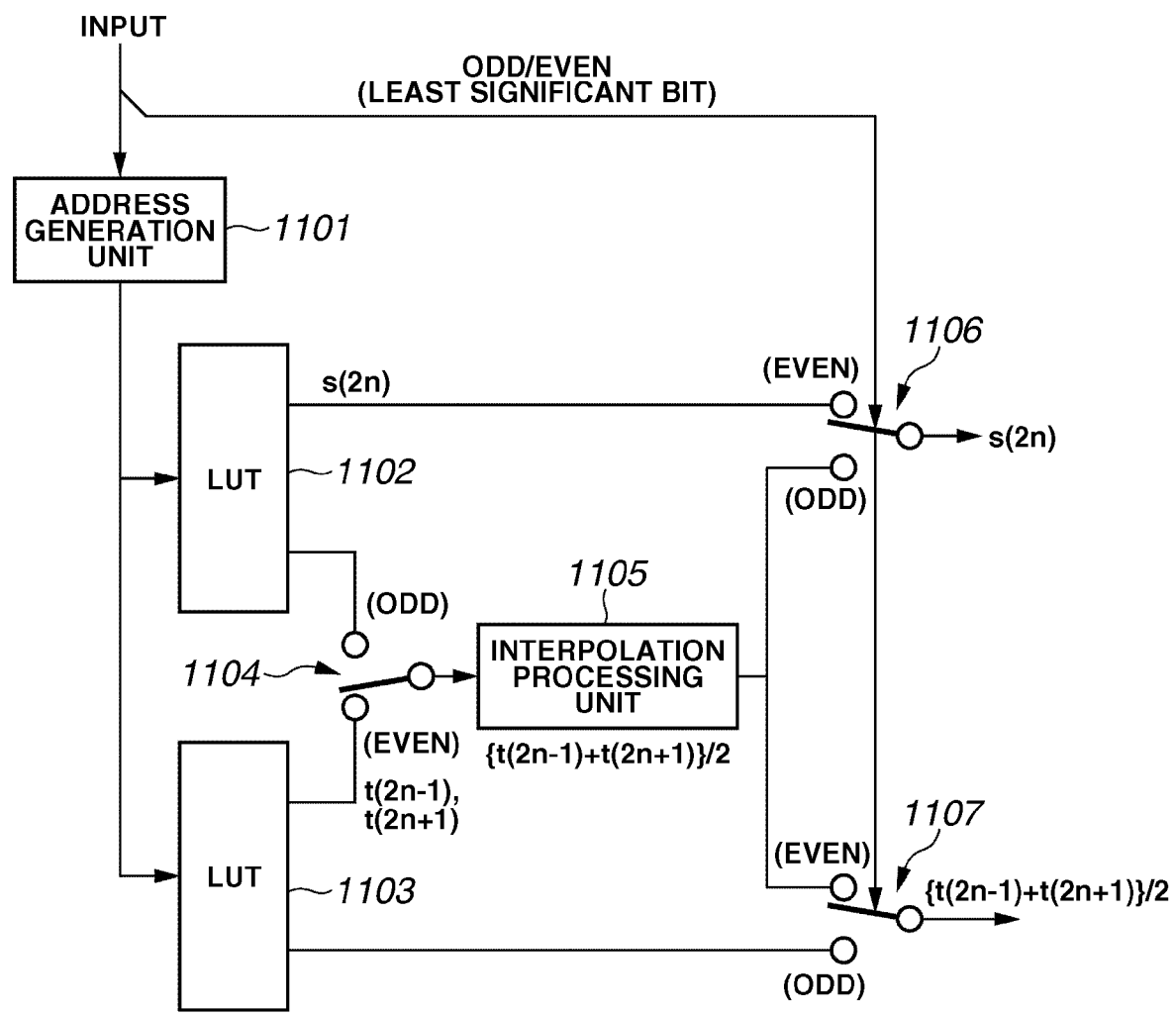

FIG. 11 illustrates the configuration of units for implementing nonlinear processing in the third exemplary embodiment of the present invention.

Figure 12:
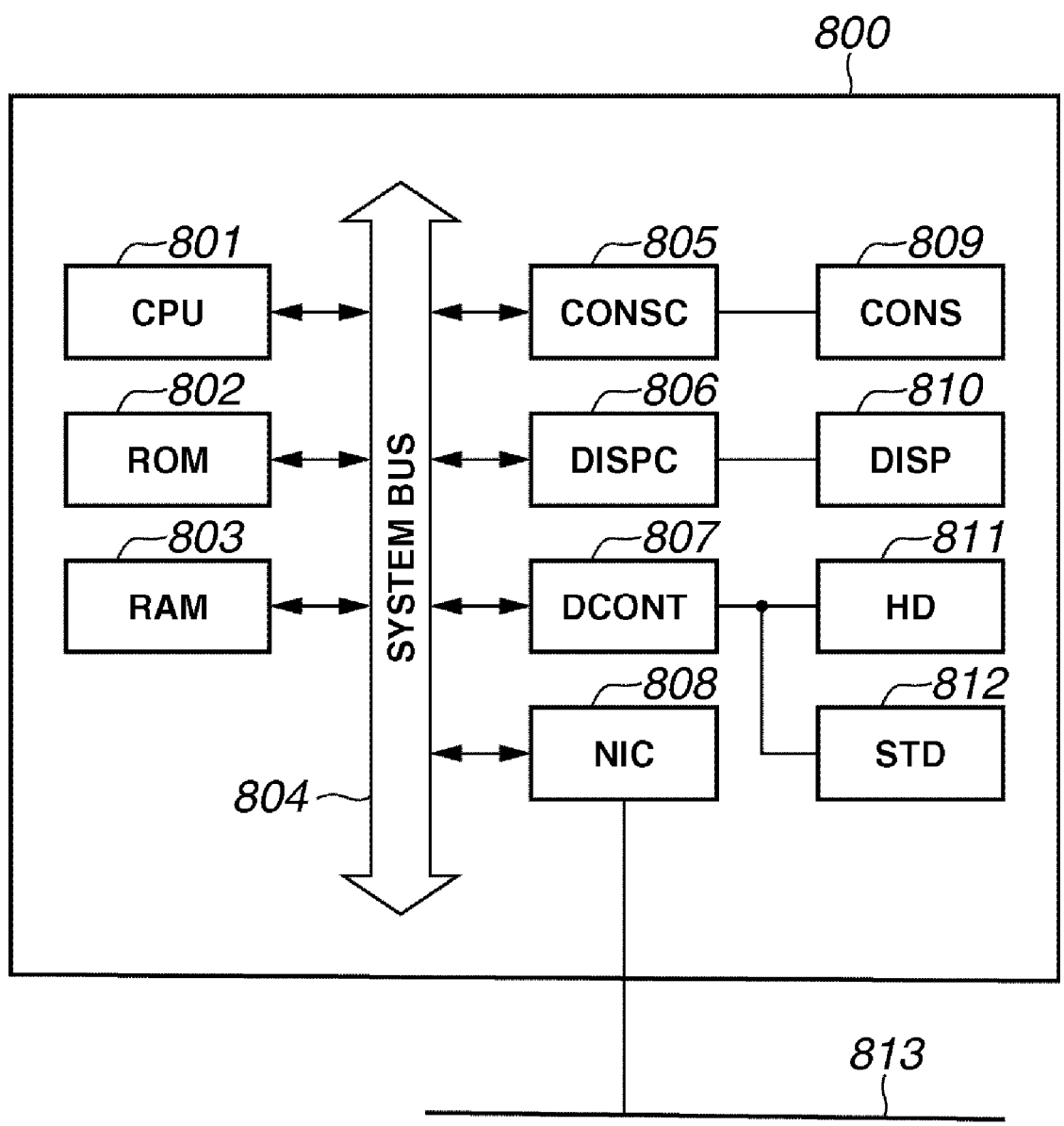

FIG. 12 illustrates a hardware configuration of an image processing apparatus according to an exemplary embodiment of the present invention.

Figure 13:
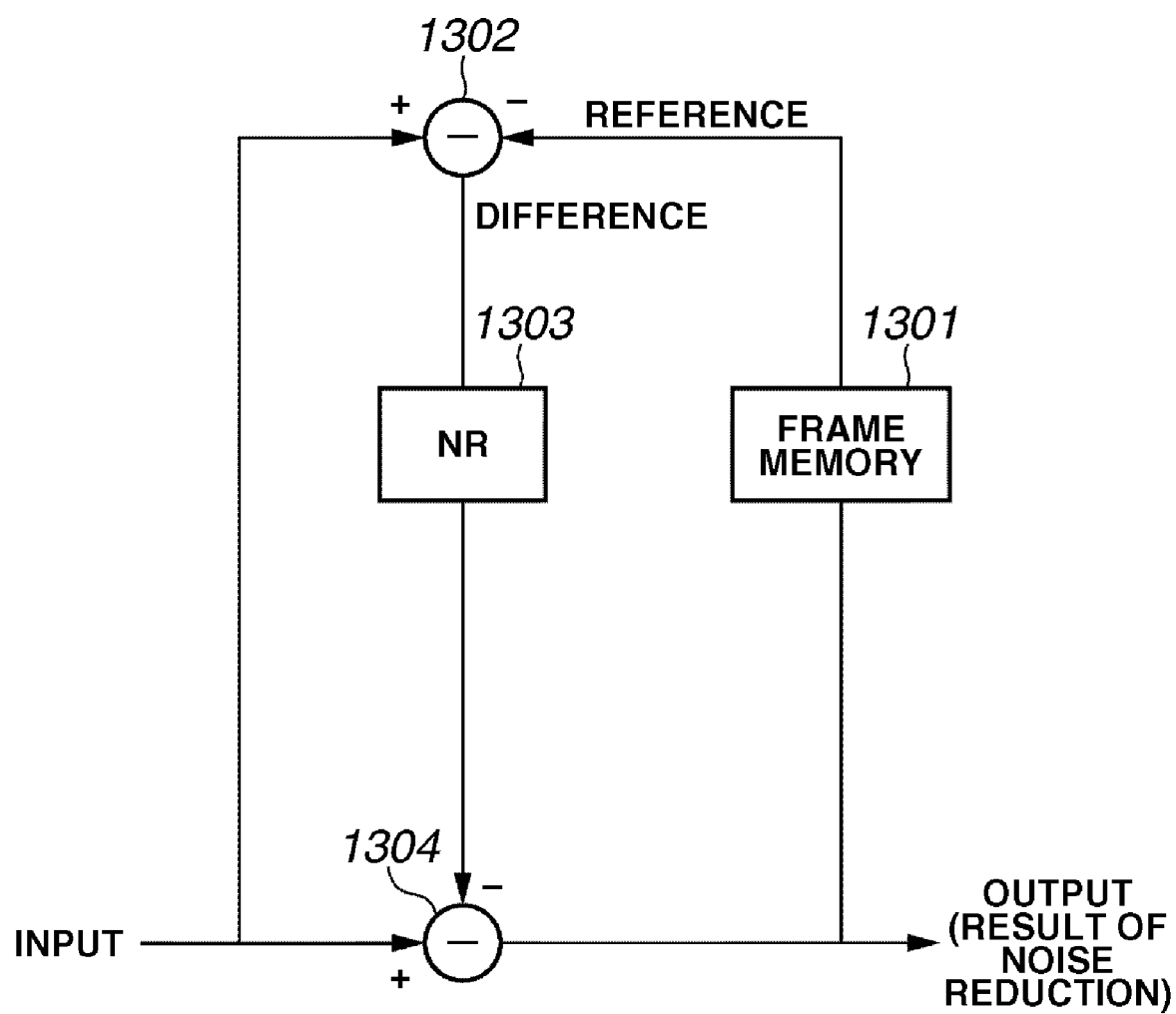
Figure 15A:
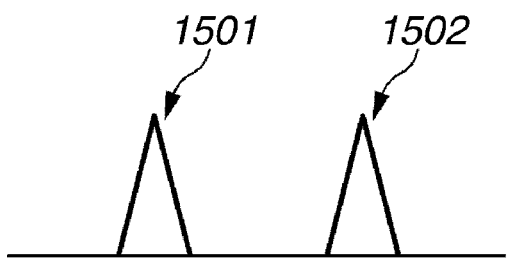
Figure 15B:
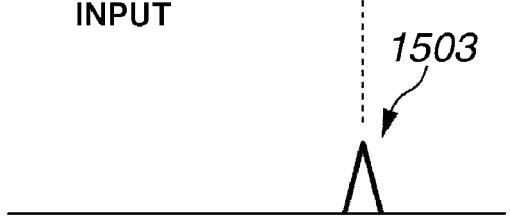
Figure 15C:
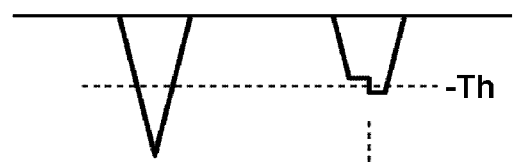
Figure 15D:
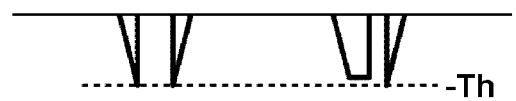
Figure 15E:

FIG. 13 illustrates a configuration of a conventional interframe noise reduction unit.

FIGS. 14A through 14E illustrate a result of interframe noise reduction in a case where a reference image contains no residual noise.

FIGS. 15A through 15E illustrate a result of interframe noise reduction in a case where a reference image contains residual noise.

FIG. 16 illustrates input/output characteristics of the nonlinear processing unit illustrated in FIG. 13.

DETAILED DESCRIPTION OF THE EMBODIMENTS

Various exemplary embodiments, features, and aspects of the invention will be described in detail below with reference to the drawings.

An image processing apparatus according to exemplary embodiments of the present invention has a multiresolution analysis function and a noise reduction function utilizing interframe correlation, and performs both a multiresolution analysis and interframe noise reduction on moving images. The image processing apparatus according to the exemplary embodiments can be applied to, e.g., an X-ray fluoroscopic imaging apparatus that takes X-ray fluoroscopic images in extremely low X-ray doses. In the following description, a moving image (i.e., an X-ray fluoroscopic image) obtained by X-ray fluoroscopic imaging is described as an object to be processed by the image processing apparatuses according to the exemplary embodiments. However, objects to be processed by the image processing apparatuses according to the exemplary embodiments are not limited thereto.

First, the multiresolution analysis function of the image processing apparatuses according to the exemplary embodiments is described. An outline of a Laplacian pyramid decomposition/reconstruction in the multiresolution analysis is described with reference to FIGS. 1 and 2.

FIG. 1 illustrates an example configuration of a decomposition/reconstruction processing unit 100 for performing a Laplacian pyramid decomposition/reconstruction of an image according to an embodiment of the present invention. As illustrated in FIG. 1, the decomposition/reconstruction processing unit 100 includes an image input unit 101, a frequency decomposition unit 102, a coefficient storage unit 103, a coefficient change unit 104, an image reconstruction unit 105, an image display unit 106, and an imaging condition input unit 107.

The image input unit 101 inputs an image of each frame of an X-ray fluoroscopic image obtained by X-ray fluoroscopic imaging. Hereinafter, a processing target frame is referred to as a t-th frame (t is a natural number). A processing target frame immediately preceding the t-th frame is referred to as a (t−1)-th frame. The image input unit 101 inputs also imaging-condition signals based on imaging-conditions and image processing settings for X-ray fluoroscopic imaging.

The imaging condition input unit 107 receives an imaging-condition signal corresponding to the t-th frame image (X-ray fluoroscopic image) from the image input unit 101.

The frequency decomposition unit 102 decomposes a frame image supplied from the image input unit 101 into a plurality of images that differ from one another in a frequency band and an image size. More specifically, the frequency decomposition unit 102 recursively executes a frequency decomposition of the t-th frame image, which is supplied from the image input unit 101, N times (N is a positive integer) Thus, the frequency decomposition unit 102 generates (N+1) coefficient groups respectively corresponding to subband-decomposed images.

Image decomposition executed by the frequency decomposition unit 102 is described with reference to FIG. 2. As illustrated in FIG. 2, in a first decomposition executed by the frequency decomposition unit 102, an original frame image F0 is decomposed into a first high-frequency sub-image H1 which has the same size as the original frame image F0 and a first low-frequency sub-image L1 (not shown) which has a half the vertical and horizontal size of the original image. The frequency decomposition unit 102 sends data of the high-frequency sub-image H1 and the low-frequency sub-image L1 obtained as a result of the first decomposition to the coefficient storage unit 103 as coefficient data. Then, the coefficient data is temporarily stored in the coefficient storage unit 103.

In a second frequency decomposition, the first low-frequency sub-image L1 is read from the coefficient storage unit 103. The read coefficient data of the first low-frequency sub-image L1 is decomposed into a second high-frequency sub-image H2 which has the same size as the first low-frequency sub-image L1 and a second low-frequency sub-image L2 which has a half the vertical and the horizontal size of the second high-frequency image H2. The frequency decomposition unit 102 also sends data of the second high-frequency sub-image H2 and the second low-frequency sub-image L2 obtained as a result of the second decomposition to the coefficient storage unit 103 as coefficient data. Then, the coefficient data is temporarily stored in the coefficient storage unit 103.

The coefficient data stored in the coefficient storage unit 103 is used to reconstruct the image.

Reconstruction of the image based on the coefficient data stored in the coefficient storage unit 103 is now described.

The reconstruction of the image is performed in a similar way to the generation of a high-frequency sub-image in the above-described frequency decomposition. Although a difference between two kinds of images is obtained at the time of generation of a high-frequency sub-image, addition of two kinds of images is performed at the time of reconstruction of the image.

That is, in a first reconstruction, the coefficient data corresponding to the second low-frequency sub-image L2 and the second high-frequency sub-image H2 are read from the coefficient storage unit 103. The image reconstruction unit 105 restores the first low-frequency sub-image L1 based on the read coefficient data and stores the restored first low-frequency sub-image L1 in the coefficient storage unit 103. In a second reconstruction, the image reconstruction unit 105 reads the stored coefficient data of the reconstructed first low-frequency sub-image L1 and the first high-frequency sub-image H1 from the coefficient storage unit 103. Further, the image reconstruction unit 105 restores the original frame image F0 based on the coefficient data read from the coefficient storage unit 103.

In actual reconstruction of an image, the coefficient change unit 104 changes coefficient data based on information (e.g., image-processing settings for sharpening and noise reduction, and imaging-conditions) supplied from the imaging condition input unit 107 when reconstruction is performed. Accordingly, an image actually reconstructed by the image reconstruction unit 105 is the same in size as the original frame image F0 but differs slightly from the original frame image F0. Upon completion of reconstruction, the image reconstruction unit 105 outputs the reconstructed image to the image display unit 106, such as a monitor.

FIG. 3 illustrates an example configuration of the decomposition/reconstruction processing unit 100 in detail.

As illustrated in FIG. 3, the decomposition/reconstruction processing unit 100 includes processing units, i.e., low-pass filters 311, 321, 331, and 341, subsampling units 312, 322, 332, and 342, upsampling units 313, 323, 333, and 343, interpolation processing units 314, 324, 334, and 344, and subtracting units 315, 325, 335, and 345. These processing units implement functions of the frequency decomposition unit 102 and the coefficient storage unit 103 illustrated in FIG. 1.

The decomposition/reconstruction processing unit 100 includes also coefficient change units 316, 326, 336, 346, and 350 which implement functions of the coefficient change unit 104 illustrated in FIG. 1.

The decomposition/reconstruction processing unit 100 also includes upsampling units 317, 327, 337, and 347, interpolation processing units 318, 328, 338, and 348, and addition units 319, 329, 339, and 349. These processing units implement functions of the image reconstruction unit 105 and the coefficient storage unit 103 illustrated in FIG. 1.

When an image of a t-th frame to be decomposed is input from a terminal 301, the five processing units 311 to 315 execute a first frequency decomposition of this image. More specifically, the low-pass filter 311 extracts a low-frequency component of the input image. Then, the subsampling unit 312 generates a reduced image by subsampling pixels of the input image to one-half in each of vertical and horizontal directions based on the low-frequency component of the input image which is extracted by the low-pass filter 311.

The reduced-image generated by the subsampling unit 312 is the first low-frequency sub-image L1. Then, the first low-frequency sub-image L1 is further decomposed by the processing units 321 to 325 in the next stage. Further, the first low-frequency sub-image L1 is enlarged by the upsampling unit 313 to the same size as the original input image. Subsequently, the enlarged image is converted by the interpolation processing unit 314 into a sub-image having only the low-frequency component of the original input image. The sub-image having only the low-frequency component of the original input image is subtracted from the input image by the subtraction unit 315. Consequently, the first high-frequency sub-image H1 is generated.

The first low-frequency sub-image L1 is further frequency-decomposed by the processing units 321 to 325. Thus, the second high-frequency sub-image H2 and the second low-frequency sub-image L2 are generated similar to the first high-frequency sub-image H1 and the first low-frequency sub-image L1. When the decomposition/reconstruction processing unit 100 illustrated in FIG. 3 further continues to recursively execute the frequency decomposition of the second low-frequency sub-image L2, the input image is further decomposed into a third high-frequency sub-image H3, a fourth high-frequency sub-image H4, and third and fourth low-frequency sub-images L3 and L4.

As a result of the frequency decompositions, the four high-frequency sub-images H1, H2, H3, and H4, and the single low-frequency sub-image L4 are obtained. The coefficient change units 316, 326, 336, 346, and 350 perform weighting of the coefficient data corresponding to the sub-images H1 to H4 and L4 based on the image-processing settings for sharpening and noise reduction, and the imaging-conditions. Thus, the processing units 317 through 319, 327 through 329, 337 through 339, and 347 through 349 reconstruct image data based on the weighted coefficient data to restore a real-space image.

Assuming that the coefficient data is not changed at all and that there is no computation error, an image which is the same as the input image can be restored in principle. This is because the processing units for the image reconstruction have almost the same configuration as a part of the processing units for the frequency decomposition. Differences in the configuration of the processing units are that the subtraction units 315, 325, 335, and 345 in the configuration of the processing units for the frequency decomposition are replaced with the addition units 319, 329, 339, and 349 in the configuration of the processing units for the image reconstruction. Thus, an image which is the same as the input image can be restored because image data to be added by the addition units to restore an original data is exactly the same as image data subtracted by the subtraction units.

Coefficient data of the fourth low-frequency sub-image L4, the vertical size and the horizontal size of which is one-sixteenth ($\frac{1}{16}$) size of the input image, is weighted by the coefficient change unit 350. Then, the upsampling unit 347 enlarges the fourth low-frequency sub-image L4 to an image, the vertical size and the horizontal size of which is one-eighth ($\frac{1}{8}$) size of the input image. Subsequently, an interpolation image having the same size as the enlarged image is generated by the interpolation processing unit 348. When the addition unit 349 adds the interpolation image generated by the interpolation processing unit 348 and the fourth high-frequency sub-image H4' whose coefficient data is changed by weighting in the coefficient change unit 346, a sub-image (decomposed image), the vertical size and the horizontal size of which is one-eighth ($\frac{1}{8}$) size of the input image is restored.

Similarly, the processing units 337 through 339, 327 through 329, and 317 through 319 recursively perform upsampling and subsequent processing. Thus, sub-images having a one-fourth size, a half size, and a same size as the input image are sequentially restored. The restored image whose size is equal to the input image input from the terminal 301 is obtained from the addition unit 319 and is output through a terminal 302 to an external monitor or the like.

In the foregoing description, for simplicity of description, a delay time due to each processing step has not been taken into consideration. However, there are two kinds of processing that should take a delay time into consideration. One is the interpolation processing. A vertical interpolation needs to be performed not only on data of a current line but also on data of the next line. Thus, it is necessary to delay the start time of the interpolation processing to wait for the required data of the next line. Accordingly, the time taken to obtain the result of the interpolation processing is delayed.

The other is generation of a delay caused by performing sequential processing in each component unit of the decomposition/reconstruction processing unit 100. Amounts of data to be processed in each of the component units of the decomposition/reconstruction processing unit 100 differ from one another according to an image size. In a case where the component-units process data inparallel, processing efficiency in the component unit which processes a relatively small amount of data is very low. Therefore, sequential processing is required. In addition, in a case where data of images corresponding to various decomposition levels are stored in one mass storage unit, such sequential processing results in higher efficiency.

As described above, time-delays occur at various places in the processing for decomposition/reconstruction of images described with reference to FIGS. 1 to 3. Thus, delay means such as delay lines or delay memories for adjusting processing timing are required to implement such a decomposition/reconstruction processing unit. FIG. 4 illustrates delay memories needed for reconstruction of an image in the decomposition/reconstruction processing unit 100 of the configuration illustrated in FIG. 3. In FIG. 4, a component having the same function of the components illustrated in FIG. 3 is designated with the same reference numeral in FIG. 3.

Delay memories 411, 421, 431, 441, and 451 are distributed in the configuration of the decomposition/reconstruction processing unit illustrated in FIG. 4. However, each delay memory needs to temporarily store high-frequency sub-images and low-frequency sub-images obtained by decomposition processing. Thus, in a case where the separate delay memories are provided in the decomposition/reconstruction processing unit, use efficiency of the delay memories is low. Accordingly, from the standpoint of cost, an integrated single memory can be used to implement the functions of the delay memories 411, 421, 431, 441, and 451. The components other than the delay memories 411, 421, 431, 441, and 451 are the same as the associated components illustrated in FIG. 3.

In the decomposition/reconstruction of an image described with reference to FIGS. 1 to 4, noise reduction which can be performed by weighting coefficient data in the coefficient change unit 104 is spatial smoothing that is likely to dull a sharp edge. Temporal smoothing cannot be performed by the noise reduction processing in such a case. The noise reduction for smoothing in a time direction is interframe noise reduction utilizing correlation between frames. An image processing apparatus according to each of exemplary embodiments described below is configured to execute interframe noise reduction processing in addition to the above-described multiresolution analysis processing.

First Exemplary Embodiment

FIG. 5 illustrates an example configuration of an image processing apparatus according to a first exemplary embodiment of the present invention. In FIG. 5, a component having the same function as the component illustrated in FIGS. 3 and 4 is designated with the same reference numeral in FIGS. 3 and 4. Repeated description will be avoided.

Interframe noise reduction units 511, 521, and 531 illustrated in FIG. 5 smooth a plurality of high-frequency sub-images obtained by frequency decomposition in a time direction to reduce noises utilizing interframe correlation. Although FIG. 5 illustrates a case where an interframe noise reduction unit is provided at a preceding stage of (or at a stage just before) a delay memory by way of example, the interframe noise reduction unit can be provided at a subsequent stage of (or at a stage just after) the delay memory.

The interframe noise reduction units 511, 521, and 531 are supplied with an output of the subtraction units 315, 325, and 335 respectively, and perform interframe noise reduction processing on the output supplied thereto. Then, the interframe noise reduction units 511, 521, and 531 output a result of the noise reduction processing to the delay memories 411, 421, and 431 respectively. Although FIG. 5 illustrates an example configuration of the image processing apparatus that is provided only with the interframe noise reduction units 511, 521, and 531, the configuration of the image processing apparatus according to the present invention is not limited thereto. Interframe noise reduction processing can be performed on a part or all of a plurality of sub-images obtained by frequency decomposition.

Decomposition/reconstruction processing of an image in the image processing apparatus according to the first exemplary embodiment illustrated in FIG. 5 is similar to the above-described decomposition/reconstruction processing. Therefore, a description thereof is omitted. Hereinafter, interframe noise reduction processing according to the first exemplary embodiment is described.

FIG. 6 illustrates an example configuration of the interframe noise reduction units 511, 521, and 531 according to the first exemplary embodiment of the present invention. Each of the interframe noise reduction unit 511, 521, and 531 includes a frame memory 601, subtraction units 602, 605, and 606, and nonlinear processing units 603 and 604.

A first noise reduction unit includes the frame memory 601, the subtraction units 602 and 605, and the nonlinear processing unit 603, and implements noise reduction processing for generating first data to be output as a result of noise reduction processing. A second noise reduction unit includes the frame memory 601, the subtraction units 602 and 606, and the nonlinear processing unit 604, and implements noise reduction processing for generating second data used to delay a frame so as to perform noise reduction processing of the next frame.

The frame memory (frame delay unit) 601 stores image data obtained by noise reduction processing for generating the second data (representing a reference image) for the noise reduction processing of the next frame. The frame memory 601 delays the stored image data by one frame and provides the delayed image data as data representing a reference image for the noise reduction processing of the next input frame image.

The first subtraction unit 602 generates an interframe difference signal by subtracting the reference image supplied from the frame memory 601 from an input frame image on which noise reduction processing is performed. The first nonlinear processing unit 603 extracts a noise signal (noise component) from the difference signal generated by the first subtraction unit 602. The second subtraction unit 605 generates a noise-reduced image by subtracting the noise signal extracted by the first nonlinear processing unit 603 from the input frame image on which the noise reduction processing is performed.

The second nonlinear processing 604 extracts a noise signal (noise component) from the difference signal generated by the first subtraction unit 602. The third subtraction unit 606 generates a noise-reduced image by subtracting the noise signal extracted by the second linear processing unit 604 from the input frame image on which the noise reduction processing is performed.

The present embodiment is provided with two nonlinear processing units for extracting noise. Consequently, the present embodiment separately generates image data which is obtained as a result of the noise reduction processing of a current frame and data representing a reference image which is used for noise reduction processing of an image after a lapse of a one frame period. Each of the nonlinear processing units 603 and 604 performs nonlinear processing for extracting noise suitable for each image. That is, according to the present embodiment, the two nonlinear processing units 603 and 604 can independently control threshold values for extracting noise, and thus, control amounts of noise reduction. Consequently, the present embodiment can implement interframe noise reduction processing that can provide less image lag and have a profound effect on noise reduction.

More specifically, in the first nonlinear processing unit 603 for generating an image to be output as a result of noise reduction processing, a first threshold value (Th1) is set to decrease an amount of noise to be extracted so as to reduce image lag. On the other hand, in the second nonlinear processing unit 604 for generating a reference image (image for delaying a frame) to be used for noise reduction processing of an image input after a lapse of a one frame period, a second threshold value (Th2) is set to increase an amount of noise to be extracted. Consequently, the noise reduction processing using the second nonlinear processing unit 604 can reduce residual noise after a lapse of a one frame period and increase an amount of noise reduction.

FIG. 7 illustrates an example of the two threshold values (Th1 and Th2) and the input/output characteristics of the nonlinear processing. As is apparent from FIG. 7, in the present embodiment, an amount of noise reduced by noise reduction processing using the first nonlinear processing unit 603 is less than noise reduced by noise reduction processing using the second nonlinear processing unit 604. A shape of a graph representing actual input/output characteristics is slightly more complex than that illustrated in FIG. 7. However, the actual input/output characteristics can easily be implemented using a look-up table.

According to a conventional method, if an image to be output as a result of noise reduction processing is used as a reference image by delay of one frame, both an effect of suppressing a blur and an image lag caused by movement of an object and an effect of reducing noise cannot be enhanced together. For example, when the image lag can be reduced, the effect of reducing noise is also reduced.

On the other hand, according to the present embodiment of the present invention, extracting of noise from an image can be executed separately from processing for making the image more appropriate for human vision.

More particularly, an image whose noise is greatly reduced is generated separately from an image to be output as a result of noise reduction processing and used as a reference image by delay of one frame. Consequently, the image processing apparatus according to the present embodiment can obtain an image that contains a less blur and a less image lag caused by movement of an object and maintains the effect of noise reduction so as to increase an amount of reduction of noise.

Second Exemplary Embodiment

In a case where a look-up table is used in each of the two nonlinear processing units in the interframe noise reduction processing unit according to the first exemplary embodiment of the present invention, a look-up table whose capacity is twice that of a conventional look-up table is required to perform the conventional interframe noise reduction processing illustrated in FIG. 13. Thus, hardware cost of the nonlinear processing units is increased.

A second exemplary embodiment according to the present invention is directed to an image processing apparatus capable of reducing look-up table capacity so as to prevent increase in the hardware cost thereof. As described above, the level of noise extracted by the first nonlinear processing unit 603 illustrated in FIG. 6 is lower than noise extracted by the second nonlinear processing unit 604. That is, noise extracted by the first nonlinear processing unit 603 is a part of noise extracted by the second nonlinear processing unit 604.

Accordingly, a signal which is substantially the same as an output signal of the first nonlinear processing unit 603 according to the first exemplary embodiment can be generated from an output signal of the second nonlinear processing unit 604. That is, a signal which is substantially the same as an output signal of the first nonlinear processing unit 603 according to the first exemplary embodiment can be generated by a third nonlinear processing unit (look-up table) which uses an output signal of the second nonlinear processing unit 604 as an input.

FIG. 8 illustrates an example configuration of an interframe noise reduction unit in the second exemplary embodiment of the present invention. An image processing apparatus according to the second exemplary embodiment differs from the first exemplary embodiment only in the internal configuration of the interframe noise reduction unit. The rest of the configuration and an operation of the second exemplary embodiment are similar to the first exemplary embodiment. Therefore, only the interframe noise reduction unit of the image processing apparatus according to the second exemplary embodiment is described hereinafter. In FIG. 8, a component having the same function as the component illustrated in FIG. 6 is designated with the same reference numeral in FIG. 6, and repeated description will be avoided.

A third nonlinear processing unit 701 illustrated in FIG. 8 is used instead of the first nonlinear processing unit 603 of the first exemplary embodiment. The third nonlinear processing unit 701 is supplied with an output signal of the second nonlinear processing unit 604, and outputs a result of nonlinear processing to the second subtraction unit 605. Thus, in the second exemplary embodiment, an output signal of the second nonlinear processing unit 604 is input to the third nonlinear processing unit 701. Accordingly, a range of input to the third nonlinear processing unit 701 is limited. Therefore, an address space of a look-up table in the third nonlinear processing unit 701 is considerably reduced, so that table capacity of the look-up table can be reduced similar to the address space thereof. For example, the table capacity of the look-up table can be reduced to about one-sixteenth (¹⁄₁₆) or one-eighth (⅛) that of the first nonlinear processing unit 603.

The second exemplary embodiment of the present invention can obtain an image that contains less blurring and less image lag caused by movement of an object, and maintains the effect of noise reduction so as to increase an amount of reduction of noise, similar to the first exemplary embodiment. In addition, each of the interframe noise reduction units according to the second exemplary embodiment includes two stages of nonlinear processing, so that a delay amount generated in each of the interframe noise reduction units is increased, as compared with that generated in each of the interframe noise reduction units according to the first exemplary embodiment. However, total table capacity of two look-up tables in the second exemplary embodiment does not very much differ from table capacity of one look-up table in the first exemplary embodiment. Consequently, increase in the cost of the apparatus can be suppressed.

Third Exemplary Embodiment

An image processing apparatus according to a third exemplary embodiment of the present invention can mitigate an increase in capacity of a look-up table and implements two kinds of linear processing with capacity of one look-up table using interpolation processing in nonlinear processing performed by nonlinear processing units in an interframe noise reduction unit. A general structure of the image processing apparatus and a configuration of the interframe noise reduction unit according to the third exemplary embodiment are similar to the first exemplary embodiment. Therefore, a repeated description thereof according to the third exemplary embodiment will be omitted.

Focusing on processing in one nonlinear processing unit, table capacity can be set to be half the range of input data. Then, the processing can be performed as follows. That is, every other input data item is converted using a look-up table, and data items between the input data items are calculated by interpolation processing. For example, when the input data is an even-numbered data item, the input data is converted using the look-up table. On the other hand, when the input data is an odd-numbered data item, converted-data is calculated by interpolation processing. Although the processing performed in the entire range of input data items in the nonlinear processing unit is nonlinear processing, the processing performed locally in the range of input data can be regarded to be linear processing. Therefore, the conversion using such interpolation can be applied to the processing in the nonlinear processing unit. A technique for using interpolation processing at data conversion which uses a look-up table to reduce table capacity of the look-up table has already been established and is commonly utilized. Therefore, a detailed description of such a technique is omitted.

Focusing on that data to be input to the two nonlinear processing units is common, the image processing apparatus according to the present embodiment is set so that a total amount of processing (or calculation) performed in the two nonlinear processing units is constant. That is, a total sum of processing amount in the first nonlinear processing unit and that in the second nonlinear processing unit is set to be a predetermined calculation amount.

More specifically, interpolation processing is performed only in one of the two kinds of nonlinear processing. That is, the interpolation processing is performed exclusively in one of the two kinds of nonlinear processing which are respectively performed in the two nonlinear processing units. Consequently, the interpolation processing to be performed in the two kinds of nonlinear processing is implemented by one interpolation processing unit. Thus, the required circuit size can be reduced.

According to the present embodiment, in a case where a first nonlinear processing unit executes interpolation processing in associated nonlinear processing when input data is odd-numbered data, a second nonlinear processing unit executes interpolation processing in associated nonlinear processing when input data is even-numbered data. Thus, data to be stored in each look-up table should be arranged corresponding to an interpolation processing method.

In a conventional method illustrated in FIG. 9 for performing interpolation processing simultaneously with nonlinear processing, even-numbered data (or odd-numbered conversion data in a middle table and bottom table of FIG. 9 are alternately arranged and stored in a top table of FIG. 9. For example, when input data is odd-numbered data, converted data is calculated by interpolation processing using the even-numbered data on both adjacent addresses of an address which corresponds to the input odd-numbered data in the top table of FIG. 9. On the other hand, a method illustrated in FIG. 10 according to the exemplary embodiment of the present invention, even-numbered data in a first conversion table in a middle part of FIG. 10 and odd-numbered data in a second conversion table in a bottom part of FIG. 10 are alternately taken and stored in a look-up table in a top part of FIG. 10. When input data is odd-numbered data, converted data is calculated by interpolation processing using the even-numbered data taken from the first conversion table. When input data is even-numbered data, converted data is calculated by interpolation processing using the odd-numbered data taken from the second conversion table.

Hereinafter, a practical example of nonlinear processing according to the third exemplary embodiment is described. In a case where input data to the nonlinear processing unit is 2n-th data (i.e., even-numbered data, where n is a positive integer), conversion data s(2n−2), t(2n−1), s(2n), and t(2n+1) respectively stored at four addresses (2n−2), (2n−1), 2n, and (2n+1) are read from the look-up table ("2n" is an address corresponding to the even number of the input data). As illustrated in FIG. 10, a sequence "s" is first nonlinear conversion data sequence s, and a sequence "t" is second nonlinear conversion data sequence t. A description of a technique for generating the addresses is omitted since the technique is publicly known.

The first nonlinear processing unit outputs the conversion data s(2n) as a result of first nonlinear processing. On the other hand, the second nonlinear processing unit calculates interpolated data {t(2n−1)+t(2n+1)}/2 using two second nonlinear conversion data items t(2n−1) and t(2n+1) of the sequence "t" and outputs the calculated interpolated-data as a result of second nonlinear processing.

In a case where input data to the nonlinear processing unit is (2m+1)-th data (i.e., odd-numbered data), conversion data s(2m), t(2m+1), s(2m+2), and t(2m+3) respectively stored at four addresses 2m, (2m+1), (2m+2), and (2m+3) are read from the look-up table ("(2m+1)" is an address corresponding to the odd number of the input data).

The second nonlinear processing unit outputs the conversion data t(2m+1) as a result of second nonlinear processing. On the other hand, the first nonlinear processing unit calculates interpolated data {s(2m)+s(2m+2)}/2 using two first nonlinear conversion data s(2m) and s(2m+2) of the sequence "s" and outputs the calculated interpolated-data as a result of first nonlinear processing.

FIG. 11 illustrates an example configuration of a unit for implementing the above-described nonlinear processing in the third exemplary embodiment of the present invention. An address generation unit 1101 illustrated in FIG. 11 generates an address corresponding to input data. A look-up table (LUT) 1102 stores first nonlinear conversion data of the sequence "s". A look up table (LUT) 1103 stores second nonlinear conversion data of the sequence "t". An interpolation processing unit 1105 performs interpolation processing. Switches 1104, 1106, and 1107 are controlled according to whether the input data is odd-number or even-number.

In a case where the input data is even-numbered data, the switch 1104 is controlled to supply data read from the LUT 1103 to the interpolation processing unit 1105. The switch 1106 is controlled to output data read from the LUT 1102. The switch 1107 is controlled to output a calculation result in the interpolation processing unit 1105.

On the other hand, in a case where the input data is odd-numbered data, the switch 1104 is controlled to supply data read from the LUT 1102 to the interpolation processing unit 1105. The switch 1106 is controlled to output a calculation result in the interpolation processing unit 1105. The switch 1107 is controlled to output data read from the LUT 1103.

The third exemplary embodiment of the present invention can obtain an image that contains less blurring and a shorter image lag caused by movement of an object and maintains the effect of noise reduction so as to increase the amount of noise reduction similar to the first exemplary embodiment. In addition, the third exemplary embodiment can implement two kinds of nonlinear processing using only one interpolation processing unit by performing interpolation processing according to whether input data is odd-number or even-number, when data is converted by the look-up table using the interpolation processing in the nonlinear processing unit.

FIG. 12 illustrates the hardware configuration of an image processing apparatus according to the first to third exemplary embodiments of the present invention.

As illustrated in FIG. 12, an image processing apparatus 800 includes a central processing unit (CPU) 801, a read-only memory (ROM) 802, and a random access memory (RAM) 803. The image processing apparatus 800 includes also a controller (CONSC) 805 of an operation/input unit (CONS) 809, and a display controller (DISPC) 806 for a display device (DISP) 810, such as a cathode-ray tube (CRT) and a liquid crystal display (LCD), serving as a display unit. The image processing apparatus 800 includes also a controller (DCONT) 807 for a hard disk (HD) 811 and a storage device (STD) 812, such as a floppy disk, and a network interface card (NIC) 808. Such functional units 801, 802, 803, 805, 806, 807, and 808 are communicably connected to one another via a system bus 804.

The CPU 801 comprehensively controls component units connected to the system bus 804 by executing software stored in the ROM 802 or the HD 811 or software supplied from the STD 812. That is, the CPU 801 reads a processing program for performing the above-described operation from the ROM 802, the HD 801, or the STD 812 and executes the read processing program to control the operation for implementing the first to third exemplary embodiments. The RAM 803 functions as a main memory or a work area for the CPU 801.

The CONSC 805 controls operations of inputting instructions and images from the CONS 809. The DISPC 806 controls a display operation of the DISP 810. The DCONT 807 controls access to the HD 811 and the STD 812 which store a boot program, various application programs, user files, network management programs, and processing programs. The NIC 808 bidirectionally exchanges data with each of the other units on a network 813.

For example, the CPU 801 for executing the processing programs supplied thereto implements the functions of the decomposition unit, the noise reduction units (the first and second noise reduction units), the coefficient change unit, and the reconstruction unit. The RAM 803 implements a function of a frame memory. Although a moving image to be processed is supplied by the CONS 809 to the image processing apparatus 800, a moving image can also be supplied to the image processing apparatus 800 via the network 813. Alternatively, a moving image can be stored in and supplied from the HD 811 and the STD 812.

Other Exemplary Embodiment

The present invention includes the following system or apparatus. That is, a software program implementing the functions of the above-described exemplary embodiments is supplied to a computer (or a CPU or a micro-processing unit (MPU)) in a system or apparatus connected to various devices so as to operate the various devices and to implement the functions of the above-described exemplary embodiments. Then, the functions of the above-described exemplary embodiments are implemented by causing the various devices to operate according to the program stored in the system or apparatus.

In this case, the software program itself implements the functions of the above-described exemplary embodiments. Such a software program itself constitutes the present invention. Units for supplying such a software program, e.g., a storage medium which stores the software program code constitute the present invention. For example, a floppy disk, a hard disk, an optical disk, a magneto-optical disk, a compact disc read-only memory (CD-ROM), a magnetic tape, a non-volatile memory card, and a read-only memory (ROM) can be used as the storage media for storing such a program.

In a case where the supplied program implements the functions of the above-described exemplary embodiments in cooperation with an operating system, other application software or the like running on the computer, such a program is included in the exemplary embodiments of the present invention.

In a case where the supplied program is stored in a memory provided in a function expansion board inserted into a computer or in a function expansion unit connected to a computer, and where subsequently, a part or all of actual processing operations using a CPU or the like provided on the function expansion board or in the function expansion unit is performed according to instructions from the program so as to implement the functions of the above-described exemplary embodiments, the program is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-152123 filed Jun. 7, 2007, which is hereby incorporated by reference herein in its entirety.

What is claimed is:

1. An image processing apparatus comprising:
   a feedback unit configured to perform first nonlinear conversion of a signal obtained by subtracting a value of a subtraction image signal from that of a current-frame image signal, and to obtain the next subtraction signal by subtracting a signal obtained by performing the first nonlinearly conversion from the current-frame image signal; and
   a noise reduction unit configured to perform second nonlinear conversion of a signal obtained by subtracting a value of the subtraction image signal from that of the current-frame image signal, and to obtain an output image signal by subtracting a signal obtained by performing the second nonlinear conversion from the current-frame image signal.

2. The image processing apparatus according to claim 1, wherein the current-frame image signal is based on an image that corresponds to at least one of frequency bands obtained by decomposing the current-frame image to a plurality of images in different frequency bands.

3. The image processing apparatus according to claim 1, further comprising:

a reconstruction unit configured to reconstruct an image based on an image signal output by the noise reduction unit.

4. The image processing apparatus according to claim 1, wherein an absolute value of a threshold value used to adjust an amount of reduction of an image signal in the second nonlinear conversion is less than a threshold value used to adjust an amount of reduction of an image signal in the first nonlinear conversion.

5. The image processing apparatus according to claim 1, wherein the first nonlinear conversion and the second nonlinear conversion are performed using a look-up table.

6. A method comprising:
  performing first nonlinear conversion of a signal obtained by subtracting a value of a subtraction image signal from that of a current-frame image signal, and then obtaining the next subtraction signal by subtracting a signal obtained by performing the first nonlinearly conversion from the current-frame image signal; and
  performing second nonlinear conversion of a signal obtained by subtracting a value of the subtraction image signal from that of the current-frame image signal, and then obtaining an output image signal by subtracting a signal obtained by performing the second nonlinear conversion from the current-frame image signal.

7. A storage medium storing a program to cause a computer to execute operations comprising:
  performing first nonlinear conversion of a signal obtained by subtracting a value of a subtraction image signal from that of a current-frame image signal, and then obtaining the next subtraction signal by subtracting a signal obtained by performing the first nonlinearly conversion from the current-frame image signal; and
  performing second nonlinear conversion of a signal obtained by subtracting a value of the subtraction image signal from that of the current-frame image signal, and then obtaining an output image signal by subtracting a signal obtained by performing the second nonlinear conversion from the current-frame image signal.

* * * * *